June 28, 1949.  M. WATTER ET AL  2,474,561
FLEXIBLE GUN MOUNT FOR AIRCRAFT

Filed Nov. 13, 1931  4 Sheets-Sheet 1

INVENTORS
Michael Watter
H. W. Doherty
BY
Bartlett Eyre Scott & Keel
ATTORNEYS

June 28, 1949.  M. WATTER ET AL  2,474,561
FLEXIBLE GUN MOUNT FOR AIRCRAFT

Filed Nov. 13, 1931  4 Sheets-Sheet 2

INVENTORS
Michael Watter
H. W. Doherty
BY
Bartlett Eyre Scott & Keel
ATTORNEYS

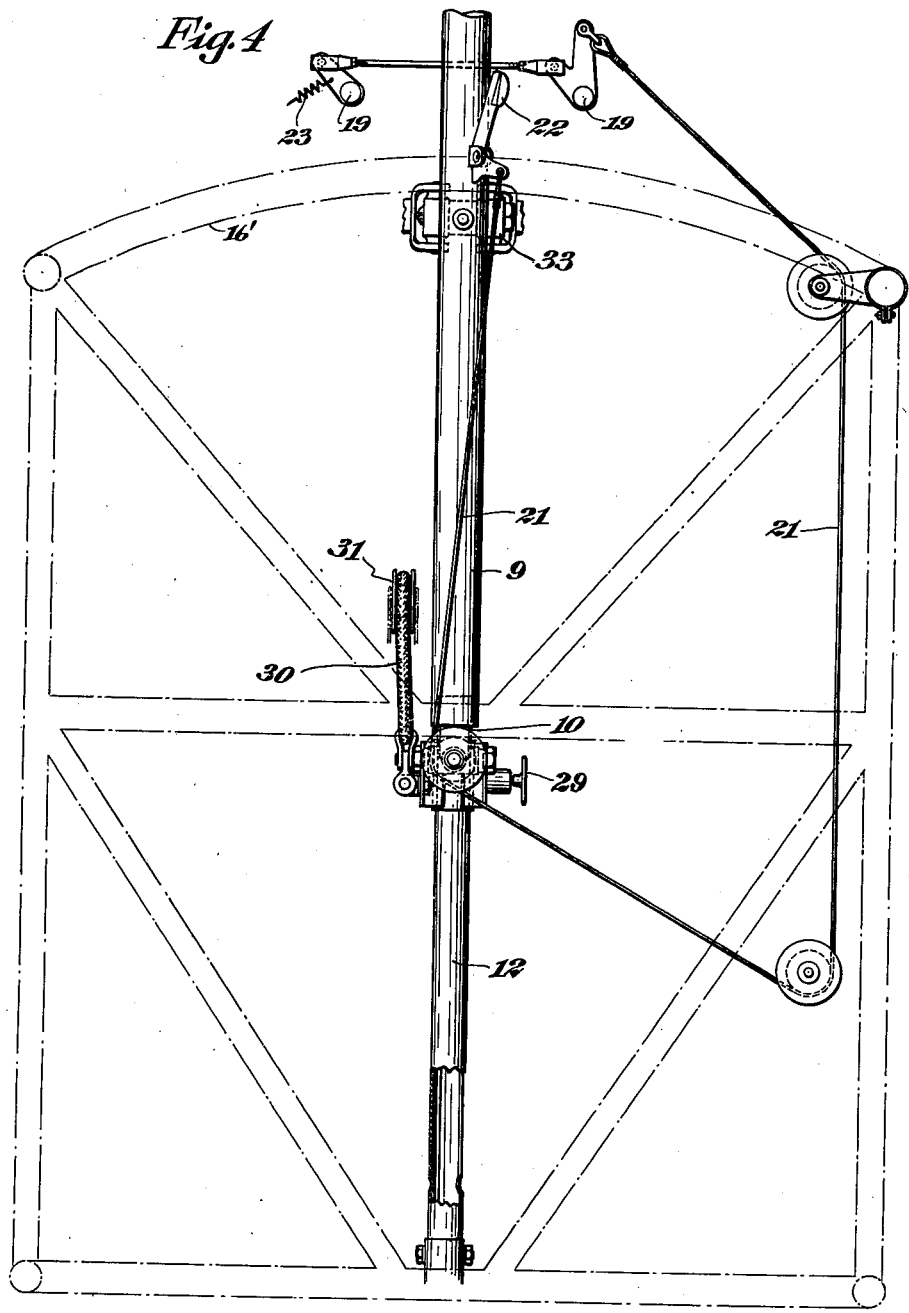

June 28, 1949.　　　M. WATTER ET AL　　　2,474,561
FLEXIBLE GUN MOUNT FOR AIRCRAFT
Filed Nov. 13, 1931　　　　　　　　4 Sheets-Sheet 4
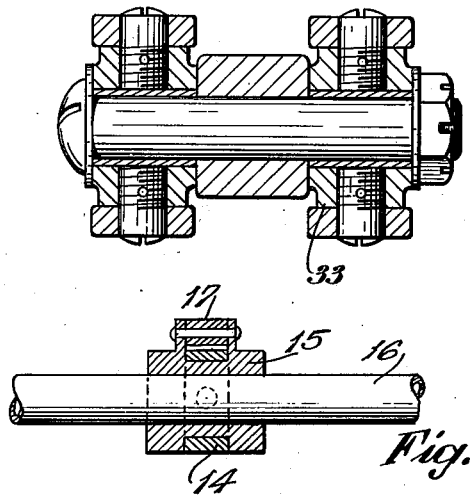
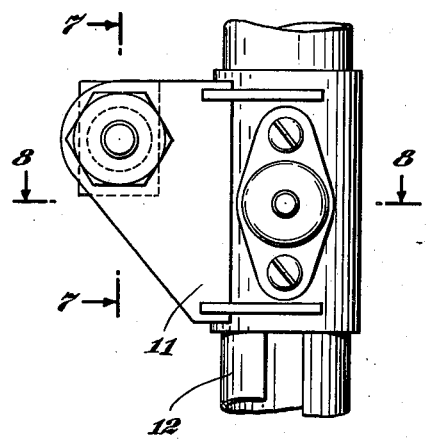
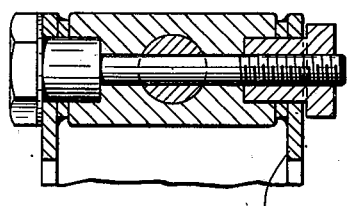
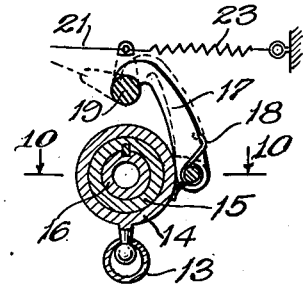
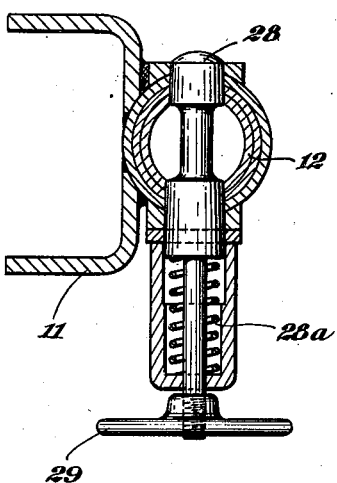

Patented June 28, 1949

2,474,561

UNITED STATES PATENT OFFICE 2,474,561

FLEXIBLE GUN MOUNT FOR AIRCRAFT

Michael Watter, New York, N. Y., and Herbert W. Doherty, East Hartford, Conn., assignors to United Aircraft Manufacturing Corporation, a corporation of Delaware Application November 13, 1931, Serial No. 574,690

8 Claims. (Cl. 89—37.5)

The invention relates to flexible gun mounts and particularly to machine gun mounts for aircraft.

The invention relates particularly to the type of gun mount set forth in application Serial No. 489,537, filed October 18, 1930, although certain features thereof are of general application.

The gun mount of that application is characterized among other things, by an arrangement whereby the major part of the structure thereof may be disposed within the streamlines of the fuselage and out of the wind stream in contrast with the common types of mounts in general use wherein the greater portion of the gun mount structure is situated on the top of the fuselage or exposed to the wind stream.

One object of the present invention is a means for facilitating the stowage of the gun and mount within the streamlines of the fuselage or within the cockpit and particularly a means of this character cooperatively functioning with that particular type of gun mount. Further objects of the invention will hereinafter appear.

Figure 1:
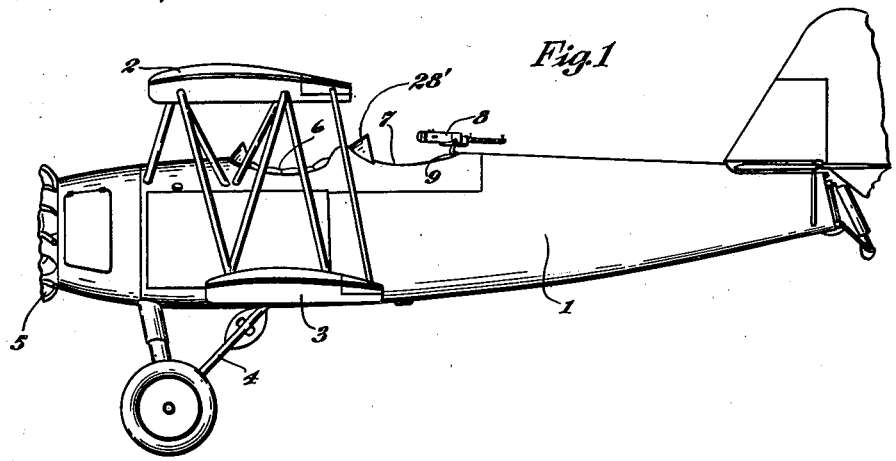
Figure 2:
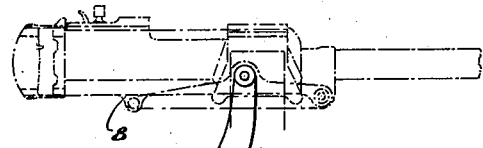
Figure 2:
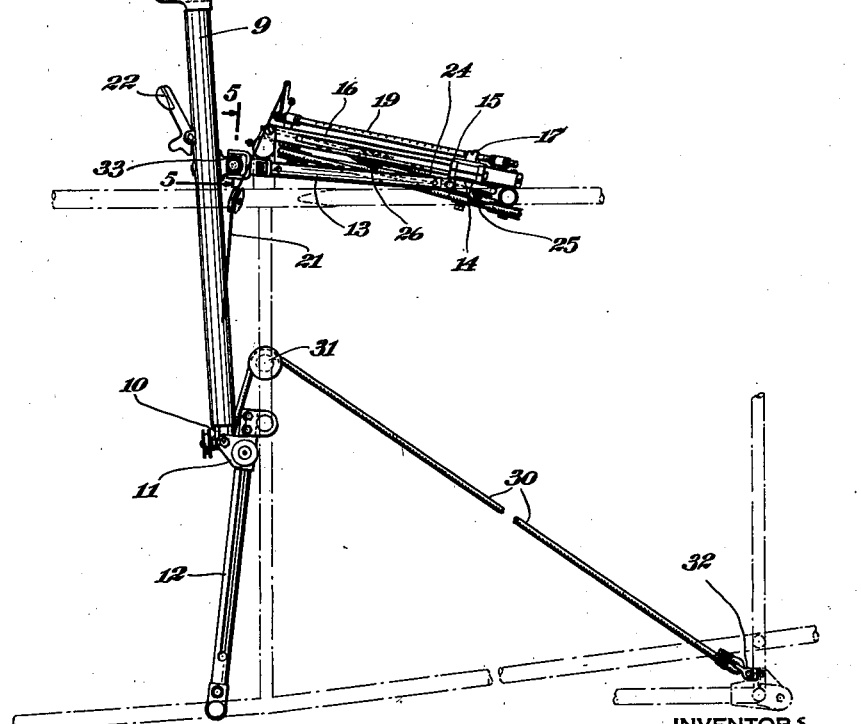
Figure 3:
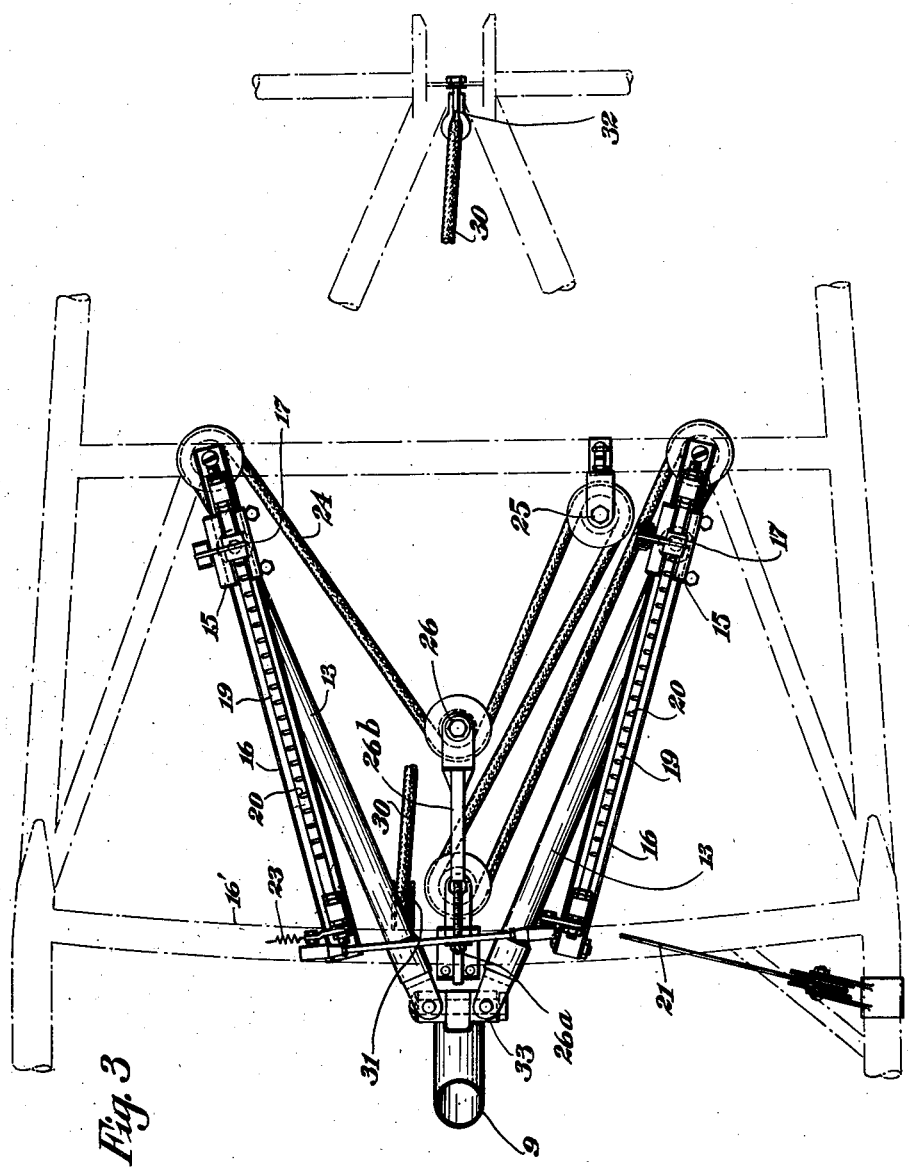

For a better understanding of the invention reference may be had to the accompanying drawings wherein:

Fig. 1 is a side elevation of an airplane showing one position of the gun in relation to the gunner's cockpit, Fig. 2 is a side view of the gun mount, Fig. 3 is a plan view of the mount, Fig. 4 is a view looking on the sliding clamp at the base of the gun standard, Fig. 5 is a section through 5—5 of Fig. 2, Fig. 6 is a view of the gun standard sliding clamp, Fig. 7 is a section through line 7—7 of Fig. 6, Fig. 8 is a section through line 8—8 of Fig. 6, and Figs. 9 and 10 show certain constructional details.

The invention is shown as embodied in an airplane having a fuselage 1, biplanes 2 and 3, carriage 4, power plant 5 and cockpits 6 and 7. In the particular embodiment shown, a machine gun 8 is mounted on a gun standard 9, to be operated from the rear cockpit. The gun standard 9, which in this instance is a straight rod, is secured by a universal connection 10 to the clamp 11 sliding on tube 12 lying approximately vertically at the front or rear of the cockpit. The gun standard 9 may assume any angular position about the universal pivot 10 and extends slightly above the rim of the cockpit and is provided at the top with a suitable swivel or trunnion mount, as required for the type of gun carried. The standard 9 is adjustable to various angular positions and held in the desired positions by retaining arms 13 which diverge from the standard and are pivotally connected to collars 15 at one end and to universal joints 33 on gun standard 9 at the other end. The pivotal connections between the arms 13 and the collars 15 comprise swiveling members 14 mounted on the collars similar to those set forth in the aforesaid application. The guide members 16 are rigidly secured to the transverse members 16' of the fuselage. The collars 15 carry locking latches 17. The locking members 19 are journalled on the transverse fuselage members 16' and may be turned by a cable 21 which extends to the hand grip 22 on the gun standard, which grip when pressed overcomes the tension of holding springs 23 turning members 19 and lifting the locking latches 17 out of engagement with the locking notches 20 of members 19 (Fig. 3), permitting the standard to be moved to the position desired. In the particular embodiment shown herein a resilient or elastic cable 24 is provided for interconnecting the retaining arms 13 and is guided over the pulleys indicated at 25 and 26. The purpose of this cable mechanism, when employed in the mount, is to assist the gunner in moving the mount around in the cockpit and to assist in returning the slides or collars 15 to the rear position. Tension of the cable may be adjusted by altering the position of pulley 26 by turning the nut 26a on its eyebolt 26b.

The gun and standard may be adjusted vertically by withdrawing locking pin 28 from the holes in slotted tube 12 by means of knob 29 on clamp 11 at the lower end of standard 9. Clamp 11 is then free to slide along slotted tube 12 and can be locked into position at either the top or bottom of tube 12 by locking pin 28. For assisting the gunner in raising the gun from the lower or stowed position to the upper or firing position, there is provided a resilient cable 30 running over pulley 31 and having one end attached to a fastening means 32 at some distance from the cockpit and the other end attached to clamp 11.

As illustrated in Fig. 1 the gun and a small section of the gun standard are the only parts of the combination projecting above the fuselage in any position, the major part of the mechanism being enclosed within the stream-lines of the fuselage. The wind pressure is, therefore, reduced to a minimum even when the gun is exposed to the air stream, and in certain positions of the standard the gun is almost entirely out of the wind stream, as for example when the gun itself is in an approximately horizontal position and behind the windshield 28' or is partly within the cockpit, depending upon the different positions capable of being assumed by the standard 9 which is pivotally connected at a point rearward of the cockpit. The rearward pull of the gun as the standard moves from the vertical is counteracted by the elastic cable 24, when employed, the tension increasing as the angle increases. When it is desired to fire over the side the standard 9 is moved laterally, one or both of the sliding collars 15 moving along the guides 16 depending upon the character of the movement given the standard.

When it is desired to move the gun to any desired position, hand grip 22 is pressed overcoming the tension of spring 23 and simultaneously members 19 are turned, lifting the locking latches out of engagement, whereupon the gun may be shifted as desired until grip 22 is released and the holding spring 23 returns the locking members to alinement and spring 18 forces the locking latches into engagement. When it is desired to stow the gun, in the particular example of construction shown, knob 29 is first pulled out, freeing locking pin 28 from the holes in the upper end of tube 12 and the gun is slid down until the magazine holder rests on top of the fuselage. To bring the gun into firing position from this first or "ready" position it can be jerked up, so that locking pin 28 springs back into the locking holes, and then swung into any position desired for action. To stow the gun it is rotated from the "ready" position into vertical position, muzzle up, and also rotated clockwise through an angle of 90° about the axis of gun standard 9, it is then swung over to the right hand side of the cockpit, and slid down until locking pin 28 is forced by spring 28a into the lower holes of tube 12, holding the gun in its lowered position with the magazine holder resting on the rear outer edge of the cockpit.

In the particular embodiment shown, retaining arms 13 and lines drawn between the collars 15 form within closely approximate limits isosceles triangles in all positions of the standard though the relative swiveling of the pivotal connections 14 may result in slight departures therefrom in certain positions.

The flexibility of the mount is unlimited and the gun may be readily moved in any direction and according to the natural motion of movement. The mount is substantially unexposed to the airstream in all positions and the greater part thereof is removed from the cockpit while the gun and the standard may be stowed, as indicated above into a position to one side of the cockpit leaving practically the whole cockpit free for personnel and equipment.

We claim:

1. In aircraft a main body having a gunner's compartment and a gun mounted therein for universal adjustment, the gun mount including a guide member in the lower part of the compartment, a slide member adjustably mounted on said guide, a standard projecting downwardly into the compartment and pivotally mounted at its lower end on said slide member and adjustable bracing mechanism disposed within the stream-lines of the main body and connected with said standard.

2. In aircraft a main body having a gunner's compartment therein and a gun mounted for universal adjustment, a guide member extending generally in an upward direction and disposed in the lower part of said compartment, said gun being mounted upon a standard projecting downwardly into the compartment and pivotally fastened at its lower end to a member adjustably mounted on said guide whereby the gun may be swung to various positions about the cockpit, the gun in certain positions being disposed within the cockpit and out of the wind stream.

3. A gun mount of the character set forth in claim 2 including a biasing device connected to the gun standard and tending to elevate the standard along said guide.

4. A gun mount of the character set forth in claim 2 including a biasing device connected to the gun standard and tending to elevate the standard along said guide together with means for locking the standard in its upper and lower positions.

5. A flexible gun mount comprising an upwardly extending guide member, a carriage device adjustably mounted thereon, a standard mounted at its lower end for universal movements on said carriage device, a pair of guide members and means adjustably interconnecting the pair of guide members and the standard whereby the three points of connection of said means with the standard and the pair of guide members form substantially an isosceles triangle in all positions.

6. In a gun mount of the character set forth in claim 2, an elastic cord biasing the sliding member to which the standard is attached in an upward direction when the gun is in the lowered position, and means for locking the sliding member in either its upper or lower position.

7. In a gun mount of the character set forth in claim 5 wherein means are provided for readily locking and releasing the said adjustable interconnecting means between the said pair of guide members and the standard.

8. A gun mount of the character set forth in claim 5 wherein the first mentioned guide member is inclined in an upward direction towards the pair of second mentioned guide members, and the latter are inclined downwardly from the standard in a divergent manner.

MICHAEL WATTER.
H. W. DOHERTY.

REFERENCES CITED

The following references are of record in the file of this patent:

UNITED STATES PATENTS

| Number | Name | Date |
|---|---|---|
| 1,280,304 | Roberts | Oct. 1, 1918 |
| 1,348,072 | Allen | July 27, 1920 |
| 1,364,525 | Scarff | Jan. 4, 1921 |
| 1,556,478 | Benet | Oct. 6, 1925 |
| 1,561,992 | Marazzi | Nov. 17, 1925 |
| 1,598,004 | Paulus | Aug. 31, 1926 |

FOREIGN PATENTS

| Number | Country | Date |
|---|---|---|
| 15,208 | Great Britain | 1915 |
| 128,244 | Great Britain | June 26, 1919 |
| 130,097 | Great Britain | July 31, 1919 |
| 299,940 | Great Britain | Nov. 8, 1928 |
| 332,398 | Great Britain | July 24, 1930 |
| 492,425 | France | Mar. 19, 1919 |